(12) United States Patent
Bauchot et al.

(10) Patent No.: US 8,407,260 B2
(45) Date of Patent: Mar. 26, 2013

(54) METHOD AND APPARATUS FOR CACHING BROADCASTING INFORMATION

(75) Inventors: Frederic Bauchot, Saint-Jeannet (FR); Jean-Luc Collet, La Gaude (FR); Gerard Marmigere, Drap (FR); Michel Porta, Cagnes/Mer (FR)

(73) Assignee: International Business Machines Corporation, Armonk, NY (US)

( * ) Notice: Subject to any disclaimer, the term of this patent is extended or adjusted under 35 U.S.C. 154(b) by 1082 days.

(21) Appl. No.: 11/762,402

(22) Filed: Jun. 13, 2007

(65) Prior Publication Data
US 2008/0005163 A1  Jan. 3, 2008

(30) Foreign Application Priority Data

Jun. 30, 2006 (EP) .................... 06116433

(51) Int. Cl.
*G06F 7/00* (2006.01)
*G06F 17/30* (2006.01)
(52) U.S. Cl. ......... 707/797; 707/748; 707/798; 717/144
(58) Field of Classification Search .......... 707/748, 707/797, 798; 717/244
See application file for complete search history.

(56) References Cited

U.S. PATENT DOCUMENTS

| | | | |
|---|---|---|---|
| 6,018,764 A | 1/2000 | Field et al. | |
| 6,098,064 A | 8/2000 | Pirolli et al. | |
| 6,128,627 A * | 10/2000 | Mattis et al. | 1/1 |
| 6,128,701 A * | 10/2000 | Malcolm et al. | 711/133 |
| 6,154,811 A * | 11/2000 | Srbljic et al. | 711/118 |
| 6,266,742 B1 * | 7/2001 | Challenger et al. | 711/133 |
| 6,317,778 B1 * | 11/2001 | Dias et al. | 709/214 |
| 6,330,395 B1 | 12/2001 | Wu | |
| 6,377,981 B1 | 4/2002 | Ollikainen et al. | |
| 6,385,699 B1 * | 5/2002 | Bozman et al. | 711/133 |
| 6,446,188 B1 * | 9/2002 | Henderson et al. | 711/206 |
| 6,459,427 B1 * | 10/2002 | Mao et al. | 725/109 |
| 6,542,967 B1 * | 4/2003 | Major | 711/134 |
| 6,598,121 B2 * | 7/2003 | Challenger et al. | 711/122 |
| 6,754,799 B2 * | 6/2004 | Frank | 711/216 |
| 6,775,231 B1 | 8/2004 | Baker et al. | |
| 7,076,611 B2 * | 7/2006 | Steere et al. | 711/133 |
| 7,328,192 B1 * | 2/2008 | Stengard et al. | 706/12 |
| 7,398,312 B1 * | 7/2008 | Guo et al. | 709/226 |
| 7,406,098 B2 | 7/2008 | Taneja et al. | |

(Continued)

FOREIGN PATENT DOCUMENTS

| | | |
|---|---|---|
| JP | 8087526 A | 4/1996 |
| JP | 2000099438 A | 4/2000 |

(Continued)

OTHER PUBLICATIONS

U.S. Appl. No. 11/762,303, USPTO Office Action Paper No. 20100323.

*Primary Examiner* — Shew-Fen Lin
(74) *Attorney, Agent, or Firm* — George R. McGuire; Blaine T. Bettiner; Bond Schoeneck & King

(57) ABSTRACT

A method of controlling the storage of web objects in a storage media, the web objects forming a closed web site and being adapted for delivery to a user, the web objects being stored on the basis of predictive determinations of which web object has the highest probability of being selected from the closed web site by the user.

18 Claims, 12 Drawing Sheets

URL Mapping Table

| Object name | Object type | OID | USAGE | Root hops | Ref cnt | Size Kb |
|---|---|---|---|---|---|---|
| Index.htm | text | 100 | Broadcast | 0 | 0 | 1 |
| Page1.htm | text | 101 | Broadcast | 1 | 1 | 1.5 |
| Page2.htm | text | 102 | Broadcast | 1 | 2 | .8 |
| Page3.htm | text | 103 | Broadcast | 1 | 2 | 1 |
| Page11.htm | text | 104 | Broadcast | 2 | 1 | 2 |
| Page12.htm | text | 105 | Broadcast | 2 | 2 | 1.3 |
| Page21.htm | text | 106 | Broadcast | 2 | 1 | |
| Page22.htm | text | 107 | Broadcast | 2 | 1 | |
| Page31.htm | text | 108 | Broadcast | 2 | 1 | |
| Page32.htm | text | 109 | Broadcast | 2 | 1 | |
| Bkgrnd.gif | image | 110 | Broadcast | 1 | 11 | |
| Video1.mpg | video | 111 | On Demand | 2 | 4 | 850 |
| Audio1.mp3 | audio | 112 | On Demand | 2 | 3 | 500 |

U.S. PATENT DOCUMENTS

| | | | |
|---|---|---|---|
| 7,483,871 B2 * | 1/2009 | Herz | 1/1 |
| 7,536,413 B1 * | 5/2009 | Mohan et al. | 1/1 |
| 7,542,881 B1 * | 6/2009 | Billiotte et al. | 703/2 |
| 7,571,167 B1 * | 8/2009 | Campana et al. | 1/1 |
| 7,596,789 B2 | 9/2009 | Olesinski et al. | |
| 7,693,804 B2 * | 4/2010 | Tung | 706/15 |
| 2002/0035672 A1 * | 3/2002 | Challenger et al. | 711/122 |
| 2002/0062384 A1 * | 5/2002 | Tso | 709/229 |
| 2002/0069296 A1 | 6/2002 | Aua et al. | |
| 2002/0178341 A1 * | 11/2002 | Frank | 711/216 |
| 2003/0030666 A1 * | 2/2003 | Najmi et al. | 345/745 |
| 2003/0174652 A1 | 9/2003 | Ebatta | |
| 2003/0200307 A1 * | 10/2003 | Raju et al. | 709/224 |
| 2004/0054572 A1 * | 3/2004 | Oldale et al. | 705/10 |
| 2004/0060068 A1 | 3/2004 | Barbier et al. | |
| 2004/0068579 A1 * | 4/2004 | Marmigere et al. | 709/242 |
| 2004/0098539 A1 * | 5/2004 | Frank | 711/118 |
| 2004/0153564 A1 | 8/2004 | Lakkakorpi | |
| 2004/0157193 A1 * | 8/2004 | Mejias et al. | 434/118 |
| 2004/0184774 A1 * | 9/2004 | Kunieda et al. | 386/69 |
| 2004/0236865 A1 * | 11/2004 | Ullman et al. | 709/231 |
| 2005/0005027 A1 * | 1/2005 | Drouet et al. | 709/245 |
| 2005/0038904 A1 | 2/2005 | Dougall | |
| 2005/0044270 A1 * | 2/2005 | Grove et al. | 709/238 |
| 2005/0278540 A1 * | 12/2005 | Cho et al. | 713/182 |
| 2006/0059474 A1 * | 3/2006 | Bhansali et al. | 717/151 |
| 2006/0136571 A1 * | 6/2006 | Kloba et al. | 709/217 |
| 2007/0124110 A1 * | 5/2007 | Tung | 702/179 |
| 2008/0005163 A1 | 1/2008 | Bauchot et al. | |
| 2009/0013083 A9 * | 1/2009 | Garcia-Luna-Aceves et al. | 709/229 |
| 2009/0319565 A1 * | 12/2009 | Greenwald et al. | 707/103 Y |

FOREIGN PATENT DOCUMENTS

| | | |
|---|---|---|
| JP | 2000311108 A | 11/2000 |
| JP | 2001209571 A | 8/2001 |
| JP | 2004260573 A | 9/2004 |
| JP | 2004280405 A | 10/2004 |

* cited by examiner

URL Mapping Table

| Object name | Object type | OID | USAGE | Root hops | Ref cnt | Size Kb |
|---|---|---|---|---|---|---|
| Index.htm | text | 100 | Broadcast | 0 | 0 | 1 |
| Page1.htm | text | 101 | Broadcast | 1 | 1 | 1.5 |
| Page2.htm | text | 102 | Broadcast | 1 | 2 | .8 |
| Page3.htm | text | 103 | Broadcast | 1 | 2 | 1 |
| Page11.htm | text | 104 | Broadcast | 2 | 1 | 2 |
| Page12.htm | text | 105 | Broadcast | 2 | 2 | 1.3 |
| Page21.htm | text | 106 | Broadcast | 2 | 1 | |
| Page22.htm | text | 107 | Broadcast | 2 | 1 | |
| Page31.htm | text | 108 | Broadcast | 2 | 1 | |
| Page32.htm | text | 109 | Broadcast | 2 | 1 | |
| Bkgrnd.gif | image | 110 | Broadcast | 1 | 11 | |
| Video1.mpg | video | 111 | On Demand | 2 | 4 | 850 |
| Audio1.mp3 | audio | 112 | On Demand | 2 | 3 | 500 |

Fig. 4

URL Hops Table

| Source ID \ Target ID | 100 | 101 | 102 | 103 | 104 | 105 | 136 | 137 | 138 |
|---|---|---|---|---|---|---|---|---|---|
| 100 | 0 | 1 | 1 | 1 | 1 | 2 | 6 | 6 | 6 |
| 101 | 1 | 0 | 2 | 2 | 2 | 1 | 7 | 7 | 7 |
| 102 | 1 | 2 | 0 | 2 | 2 | 3 | 6 | 7 | 7 |
| 103 | 1 | 2 | 2 | 0 | 2 | 3 | 5 | 6 | 6 |
| 104 | 1 | 2 | 2 | 2 | 0 | 3 | 8 | 5 | 5 |
| 105 | 2 | 1 | 3 | 3 | 3 | 0 | 7 | 8 | 8 |
| 106 | 2 | 1 | 3 | 3 | 3 | 2 | 7 | 8 | 8 |
| 107 | 2 | 3 | | | | | | | |
| 136 | 6 | 6 | 6 | 6 | 6 | 8 | 0 | 9 | 9 |
| 137 | 6 | 7 | 7 | 7 | 7 | 7 | 9 | 0 | 1 |
| 138 | 6 | 7 | 7 | 7 | 7 | 7 | 9 | 1 | 0 |

Fig. 6

Cache table

| OID | Status | Size | Hops | Neighbour OID |
|-----|--------|------|------|---------------|
| 100 | Cached | 1 | 1 | 101,102,103,104,105,107,108,109;110,111 |
| 101 | Cached | 1.2 | 2 | 100,102,103,104,105,107,108,112;113,114,115 |
| 102 | Cached | .8 | 0 | 100,101,103,104,107,108,112;113,114,115 |
| 103 | Cached | .6 | 2 | 100,101,102,104,107,108,112;113,114,115 |
| 104 | Cached | .4 | 2 | 100,101,102,103,,108,109;110,111,120,117,118,119 |
| 105 | May be supressed | 1.5 | 3 | |
| 106 | May be supressed | .6 | 3 | |
| 107 | To be cached | .6 | 1 | |
| 108 | Cached | 1 | 2 | |
| 109 | May be supressed | .5 | 3 | |
| 110 | May be supressed | .2 | 3 | |
| 111 | May be supressed | .2 | 3 | |
| 112 | To be cached | .5 | 2 | |
| 113 | To be cached | 1.2 | 2 | |
| 114 | To be cached | .8 | 2 | |
| 115 | To be cached | 1 | 2 | |

Fig. 10

METHOD AND APPARATUS FOR CACHING BROADCASTING INFORMATION

REFERENCE TO RELATED APPLICATION

The present application claims priority to European Patent Application No. EP06116433.1 filed Jun. 30, 2006, the entirety of which is hereby incorporated by reference. This application is related to U.S. patent application Ser. No. 11/762,303 entitled "A Method and Apparatus for Broadcasting Information", filed on Jun. 13, 2007, and hereby incorporated by reference.

FIELD OF THE INVENTION

The present invention relates to a method and apparatus for caching broadcasting information, particularly but not exclusively to information presented in the form of web information.

BACKGROUND ART

In the environment of mobile television (e.g. hand held television) there currently exist two complementary broadcasting techniques. Mobile TV technology offers consumers the chance to enjoy high quality terrestrial digital broadcasts along with voice telephony and Internet access all in a single wireless device. The digital video broadcast for hand-held (DVB-H) broadcasts Internet Protocol (IP) data-casts. This is an end-to-end broadcast system for the delivery of any type of digital content and services using IP based mechanisms that are optimised for devices with limitations on computational and battery resources.

An inherent part of IP data-cast (IPDC) is that it comprises a unidirectional DVD broadcast path that may be combined with a bidirectional mobile cellular interactive part. This means that IPDC is a valuable platform for enabling the convergence of services from broadcast media and telecommunications demand.

The file delivery method used in the IPDC is based on the FLUTE protocol. FLUTE (File Delivery Over Unidirectional Transport) delivers contents in files, which may contain any type of data (e.g. Audio, video, binary, still images, texts. ESG carriage return, meta-data etc.).

It is possible to access a web server using mobile equipment, for example using WIFI. However, WIFI coverage tends to be very limited and is generally only used in private areas or airports and the like. Although it is possible to connect to a web server using 2.5 G or 3 G communication means such as GPRS, EDGE or UMTS. In order to do this, it is also necessary to have a subscription which can be expensive and tends to be used by professionals and is not always attractive to public audiences of everyday people. New standards are emerging to broadcast TV on mobile equipment (e.g. DVB-H). Some of these standards define means for object transmission.

FIG. 1 depicts a known mobile internet infrastructure 100 and a separated Digital Video Broadcast infrastructure 102. A mobile user may access both TV channels and an internet site using a mobile device 104. TV channel may be broadcast using for example DVB-H in Europe. A video source 106 is broadcasted using a DVB-H head-end 108 which may include a DVB-H Encapsulator, a DVB-H Streamer or modulator 112 and an amplifier 114. A VHF/UHF signal 116 is emitted by the DVB-H head-end and is received by the mobile device 104. The mobile device may be a GSM phone or a PDA enabled to process DVB-H. In a parallel mode, the mobile device 150 may support conventional Web browser capabilities and can receive signals 118 from an access point 120 belonging to a GPRS/UMTS network 122 for example. The GPRS/UMTS network may access the internet 124 by means of a Telco gateway 126. The internet may access a web server 128 to obtain content for transmission to the user. The web server 128 may also be accessed by means of a non-mobile device, for example computer 130 which may be connected via a wired line such as PSTN, ADSL, etc.

Some of the problems that are encountered with the present systems and methods are set out as follows:

First there is a requirement for expensive subscriptions and wireless equipment able to support a communication stack able to reach the internet and a separate communication stack able to receive broadcast television. A further problem exists in that coverage for internet and TV broadcast are not necessarily equivalent in certain areas, some areas may have coverage of one, some may have coverage of another, and some may have coverage of both or neither.

Applicant's co-pending application Ser. No. 11/762,303 filed Jun. 13, 2007 discloses a method and apparatus to transfer and receive web objects and video media through the same media channel, and the entirety of its disclosure is hereby incorporated by reference. The matter of scheduling of the web objects is discussed therein, and the present invention relates to additional inventive features thereof.

One object of the present invention is to overcome at least some of the problems associated with prior art broadcasting methods and systems.

Another object of the present invention is to use new broadcast transmission means to transfer both DVB-H type objects and web type objects through the same media and to schedule the web type object in an intelligent manner.

A further object of the invention is to provide a method for broadcasting website to mobile equipment without requiring return channel means to indicate preferences, but instead to use predictions to assist with the scheduling.

SUMMARY OF THE INVENTION

The present invention is directed to the method and system as defined in the independent claims.

More particularly the present invention discloses a method of controlling the storage of web objects in a storage media, the web objects forming a closed web site and being adapted for delivery to a user, the web objects being stored on the basis of predictive determinations of which web object has the highest probability of being selected from the closed web site by the user, the method comprising: identifying a plurality of web objects which form the closed web site; determining a web tree of the closed web site; identifying at least one parameter associated with each web object of the web tree; determining from the at least one parameter of each web object a probability of the web object being selected so as to generate a list of likely web objects; ordering the likely web objects in accordance with their probability; storing the web object from the set of likely objects in order of their relative probability such that those with the highest probability are stored first; and continuing the storing step for as long as there is available capacity in the storage media.

Further embodiments of the invention are provided in the appended dependent claims.

This invention has an advantage of a scheduler which broadcasts periodically with a frequency related to the probability and predictions of what might be viewed next by a user. By updating parameters of a web object (such as hops or jumps from a root object, size, web tree linkage information etc.) subsequent web objects can be predicted and stored without a need for a return channel and the expense and complexity thereof.

Another advantage exists with respect to the function of allowing reception of web objects. This new function may be added as a service and is viewed by any conventional web browser as a web proxy. When an object is requested by the web browser, the proxy intercepts the request and waits for the reception of said object. As soon as the object reception is complete without error, said object is returned to the web browser and then on to the user. The proxy thus stores web objects which have the highest probability of being selected by a user based on the currently viewed object.

A further advantage is the extension of the functionality of this proxy by caching all pages being at a maximum predefined hops count from the current displayed page. These objects may be called neighboring web objects. As the cache size is limited, web object which are not part of a group of neighboring objects may be suppressed if necessary.

BRIEF DESCRIPTION OF THE DRAWINGS

Reference will now be made by way of example, to the accompanying drawings, in which:

FIG. 4 is a table which shows the URL mapping of the web objects according to the present invention.

FIG. 6 is a URL hops table.

FIG. 10 depicts the table managed by the predictive caching function in accordance with the present invention.

DETAILED DESCRIPTION OF THE PREFERRED EMBODIMENT

Figure 2:
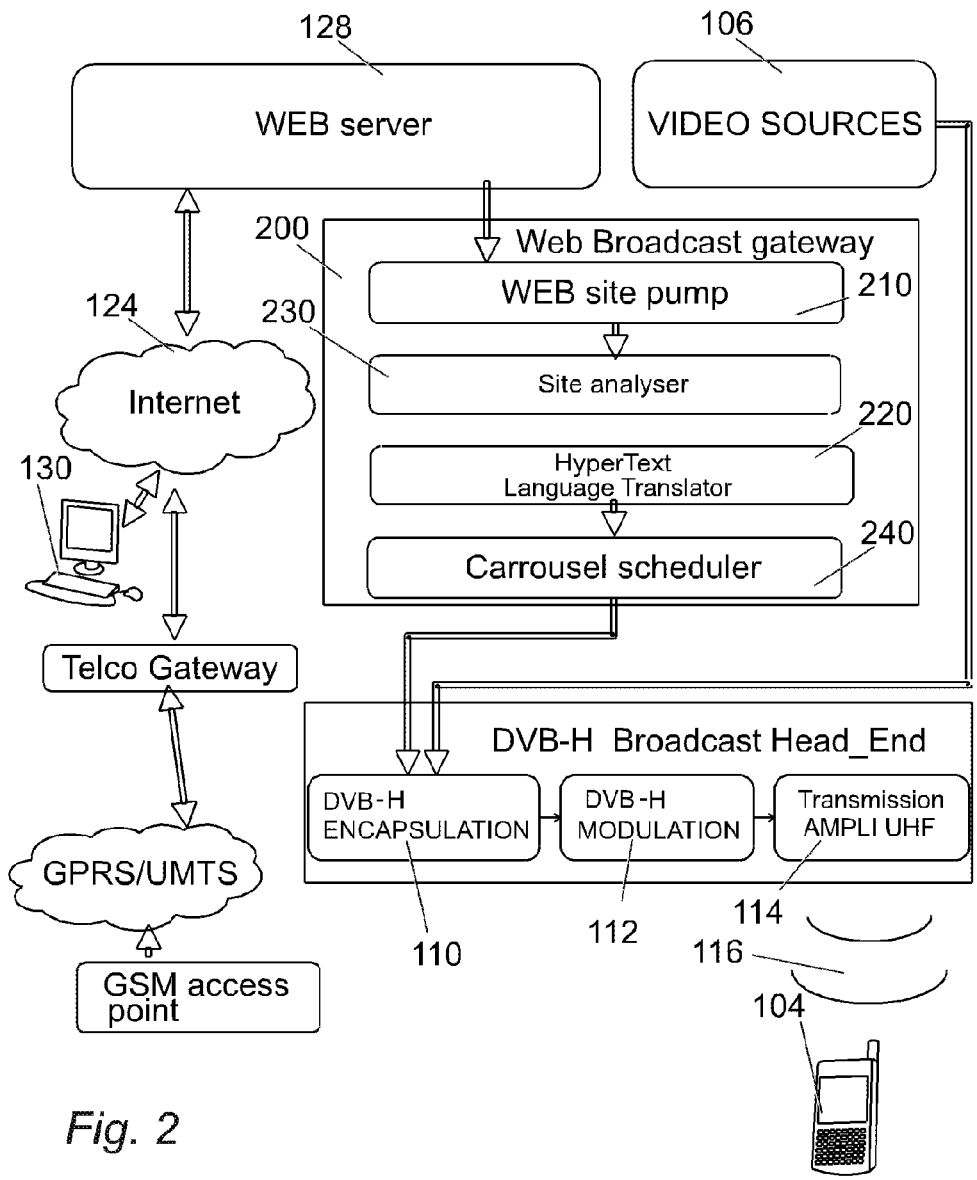
FIG. 2 is a block diagram of a Web Cast and Digital Video Broadcast infrastructure according to the present invention.

The FIG. 2 shows a web cast and digital video broadcast infrastructure, which includes a web broadcast gateway 200 in accordance with the present invention. The web broadcast gateway 200 is a link between a web server 202 and the digital video broadcast environment. The web broadcast gateway 200 allows a mobile user having only broadcast TV capabilities, to access a web site and to access web objects such as music, Video, images, etc. The term web objects used herein is intended to include all types of information found on the web. The web broadcast gateway is used to broadcast objects forming a so-called "closed web site". The term closed web site defines a web site in which links found on a web page of the site, refer to an object of this web site. In other words, no reference to an "external site" may be found in a web page of a closed web site. This will be described in greater detail below.

The closed web site is generated in any appropriate manner. Once the closed web site is formed it is broadcast from the transmitter as will be described below.

In a preferred embodiment of this invention the web broadcast gateway includes four main elements. The first element of the web broadcast gateway is a website pump 210, which periodically explores the closed web site to identify each object belonging to this site. For each object found, a unique reference termed a "unique object identifier" (OID) is determined and a record is added or updated in a table which contains all the objects constituting the closed web site. This table is formed during an interrogation phase in which the content and the relationships between objects forming the closed web site is determined. The table may be marked as complete once the interrogation phase is finished.

The second element of the web broadcast gateway is a Hypertext language translator 220 which modifies the URL found in the web page (HTML, WML, etc.) to a new URL which comprises the OID and optionally meta-data relating to the web page or object. This will be described in greater detail below.

The third element of the web broadcast gateway is a site analyzer 230 which scans all the objects of the closed web site and computes the number of hops separating any object from all other objects included in the closed web site.

The fourth element of the web broadcast gateway is the scheduler 240. The scheduler may be in the form of a carrousel which utilizes the table built by the web site pump 210 and modified by the site analyzer 230. The scheduler 240 includes a weighting associated with each object. The weighting is based on the number of references to this object in the other closed web site pages or objects, the number of "hops" to reach this object from the root page and the size of the object. Using this weighting, the carrousel is populated. The web objects which are identified and stored are delivered to the user using the FLUTE protocol as will be described in greater detail below.

Figure 1:
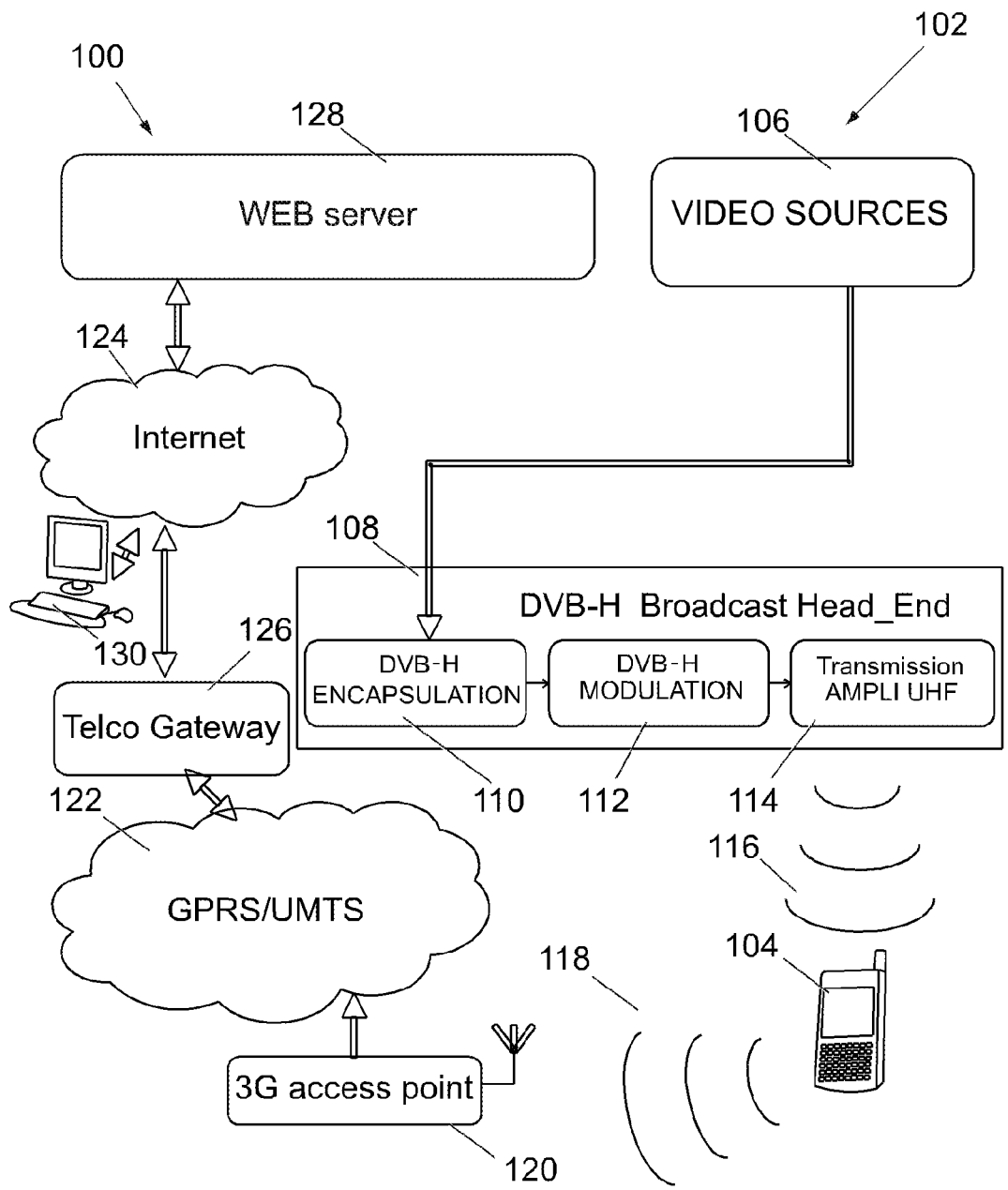
FIG. 1 is a block diagram of a prior art system for a mobile internet infrastructure and a separated Digital Video Broadcast infrastructure.

The web objects are downloaded from the web server 128 prior to being processed and stored by the web broadcast gateway 200. The mobile internet structure described in FIG. 1 is still maintained, i.e. the Telco gateway, GPRS/UMTS and the GSM access point. However they are not used to download web objects. Instead the output from the web broadcast gateway (from the carrousel scheduler 240) is combined with the video source output in the DVB-H encapsulation module as will be described in more detail below. The DVB-H broadcast occurs in bursts with video being broadcast in some bursts and data in others. The carrousel scheduler sends objects in accordance with their weightings. These weightings depend on the position of the object in the closed web site. For example the root page may be sent many times in each circulation of the carrousel, whilst object at the lowest level of the closed web site may be sent only once or twice during each circulation. Similarly objects in between may be sent a several times during each circulation of the carrousel.

The mobile device 104 thus only receives transmissions from the DVB-H broadcast head-end for video and web objects in accordance with the present invention. Other connections are still available for other forms of technology for exampled GPRS or UMTS via link 118. However for the purposes of this invention these other connections will not be described further.

Figure 3:
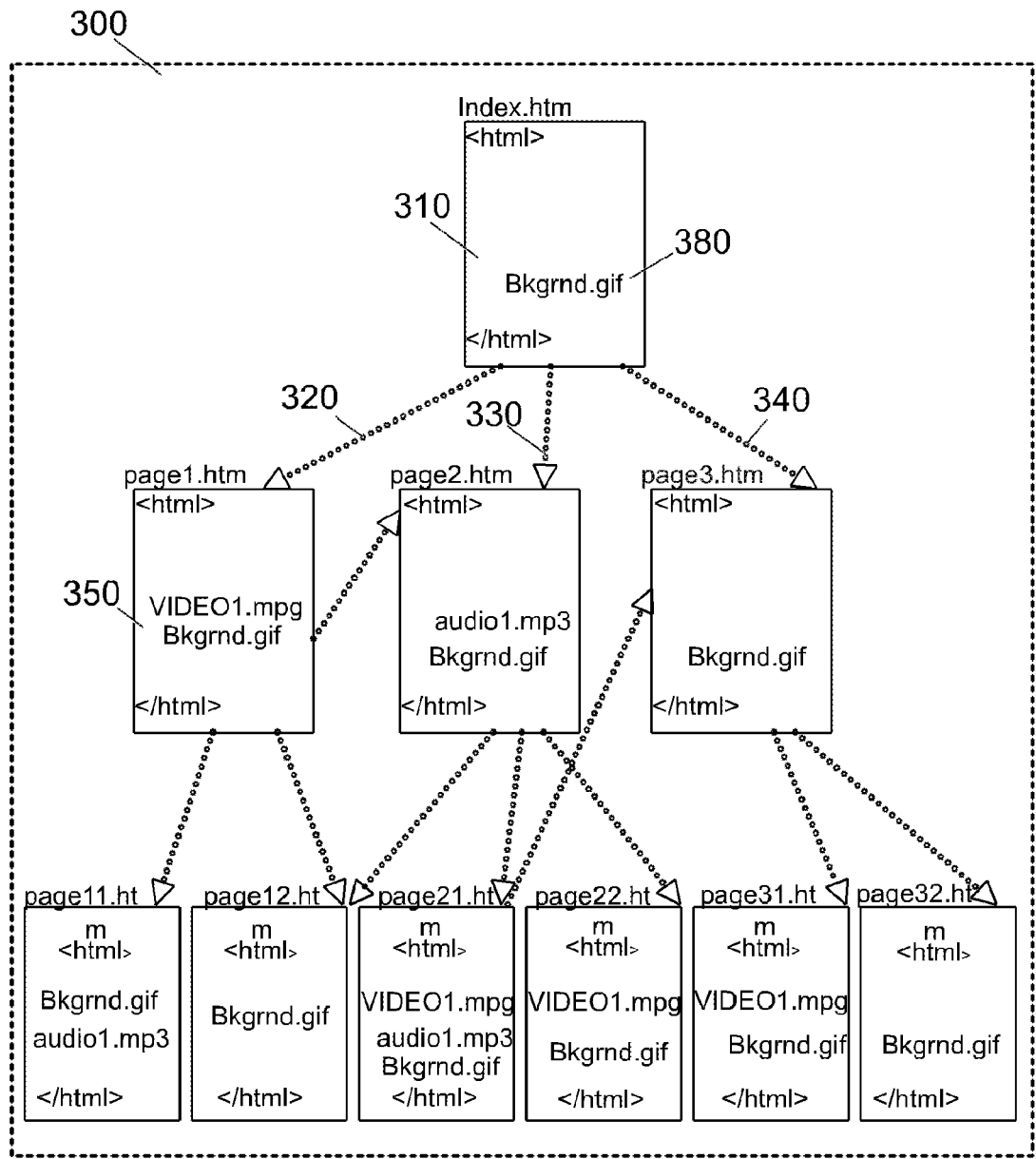
FIG. 3 is a block diagram showing the relationship between different web objects according to the present invention.

The "closed web site" will now be described in more detail with reference to FIG. 3. FIG. 3 shows web objects with their relationships within a closed web site 300. The closed web site is a site where there is no reference to an external web site having references to other sites. In other words, the number of hops starting from the root page to reach the farthest web object in the site is limited to a predefined value. This can vary depending on the storage capacity, the nature of the tree (i.e. how many pages at each hop) and the individual page sizes etc. If there are external references (i.e. outside the closed web site) these can be ignored and/or generate an appropriate message for the user to indicate that the external reference is not available. In the closed web site 300 the root page 310 (Index.htm) has four links. Three links are on other web pages, link 320 on page1.htm 350, link 330 on page2.htm and link 340 on page3.htm. The fourth link refers to an image 380 (Bkgrnd.gif). In turn each of the pages on the second level (Page 1, Page 2 and Page 3) have links to pages at a third level which are two hops from the root page 310. Page2.htm is referenced two times in root page (index.htm) 310 and in page1.htm 350 and this can be reached from different routes.

The third level of pages (pages 11, 12, 21, 22, 31 and 32) is the final level in this example. In other situations the tree could include more or less than three levels of pages. A file (or object) VIDEO1.mpg can be accessed in a number of different locations (e.g. page 1, page 21, page 22 and page 31). Similarly AUDIO1.mp3 can be accessed on pages 2, 11 and 21. This gives flexibility to the user in accessing web objects or files and will assist in minimizing delays in the user viewing specific pages. With knowledge of the web object tree and the various jumps, hops or steps between respective pages a table can be created which will be described shortly with reference to FIG. 4. This enables the system of the present invention to operate hypertext language translations and to optimize storage.

The FIG. 4 shows a URL Mapping table 400 according to the present invention in which each entry represents an object of the closed web site shown in FIG. 3. The table includes a number of columns in which the headings are identified and described below.

A page name 410 is shown in column 1 and is the name of the object as defined in the web server. This name may be prefixed by a hierarchy of directories which are under the Web home directory, or in any other appropriate manner.

An object type 430 is shown in column 2 and indicates the Web object type. Examples include "Text" for html or wml pages; "image" for Jpeg, gif, tiff or any other image or photo files; "audio" for mp3, wma, avi or any other audio or music file formats; "video" for mpeg, avi, QuickTime movie or any other video file formats.

An object identifier (OID) 440 is shown in the next column. The OID is a unique reference number which identifies the web object in the closed web site. This OID will substitute the page name in the links found in all the pages forming the closed web site as will be described in greater detail below.

A field indicating usage 450 is also identified and populated. Although all objects are broadcast, some objects may not be usable as they are received with control access protection. To make these objects usable, the user (consumer) may request a license. Usage "on demand" is associated with these protected objects, while usage "broadcast" is used for all other objects.

A root hop count 460 indicates the number of pages separating the object from the root page. This information will be used to compute the object weight for the carrousel scheduling.

A reference count 470 is the number of references pointing to an object in all the pages in the closed web site. This information is also used in the computation of the object weight for the carrousel scheduling.

A size indicator 480 of object gives the size in Kbytes and is also used in the computation of the object weight for the carrousel scheduling as will be described below.

The above-described table is used in the translator and also in the scheduler (or carrousel) as will be described below.

Figure 5:
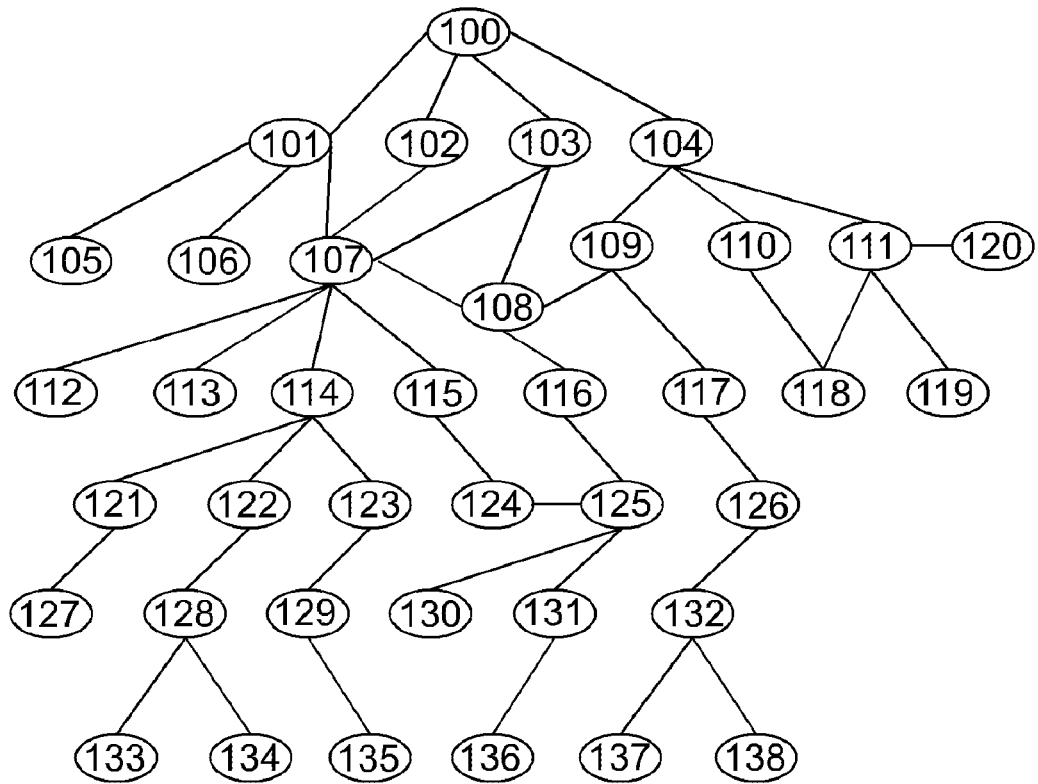
FIG. 5 is a map diagram of a complex web site, showing the interconnections.

FIG. 5 shows a complete web tree for a small closed web site 500 used as an example in this invention. The web object with the OID reference 100 is the root page. Neighboring pages or objects separated by one hop are indicated as 101, 102, 103 and 104 and neighboring pages separated by two hops are 105, 106, 107, 108, 109, 110, and 111. Pages with three, four, five, and six hops are also shown. Some pages can be reached via different routes which will clearly change the number of hops. Generally the shortest number of hops will be chosen as the optimum, but there may be occasions where different routes from one page to another will be utilized.

FIG. 6 shows a URL Hops table 600 for the FIG. 5 web tree. This table is built by the site analyzer 230, the site analyzer scans all the objects of the closed web site and computes the number of hops separating any object from all the other objects in the closed web site. The columns of the table represent the target web object OID 610, while the rows represent the source or active web object. For example if the reference object is OID 100 (670), the target objects with OID's 101, 102, 103 and 104 (640) are separated by one hop, while those with OID's 136, 137 and 138 (650) are separated by six hops.

Figure 7:
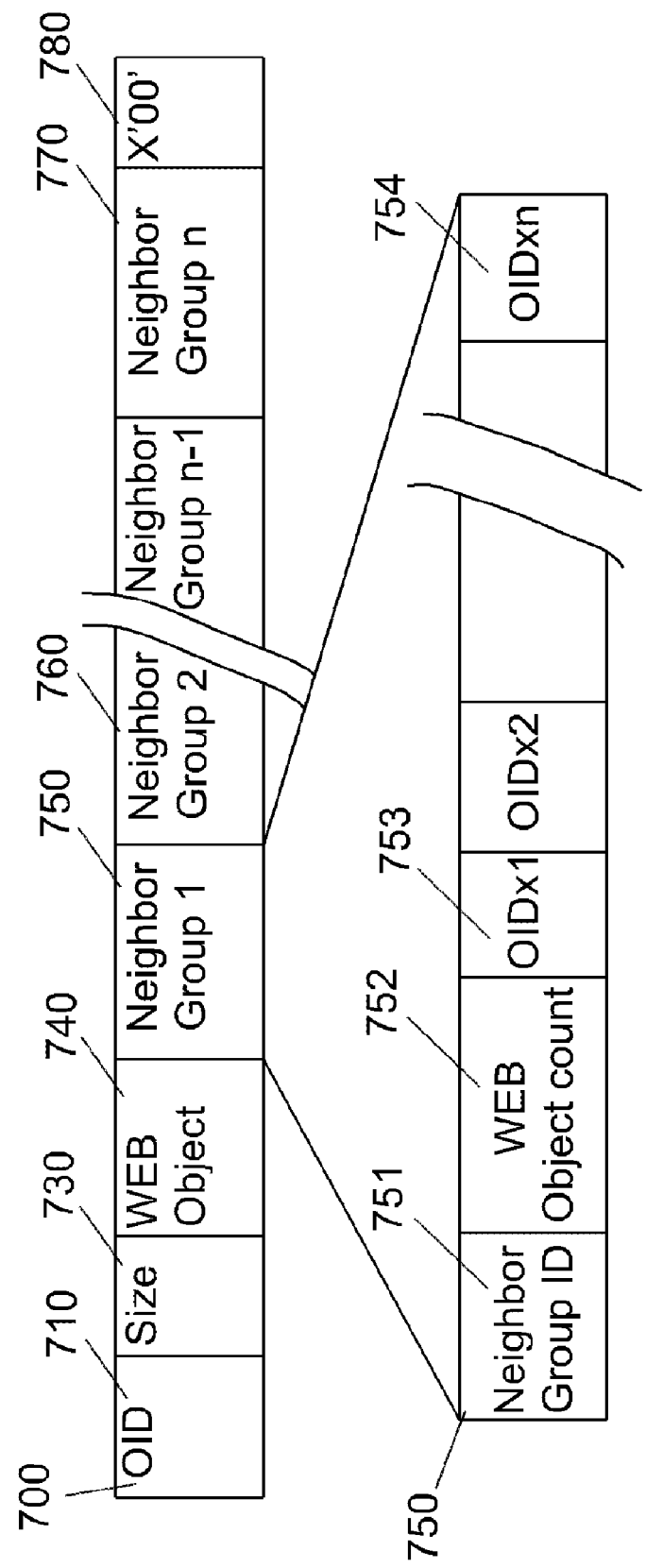
FIG. 7 shows the structure of a web object as it would be transported over the medium.
Figure 8:
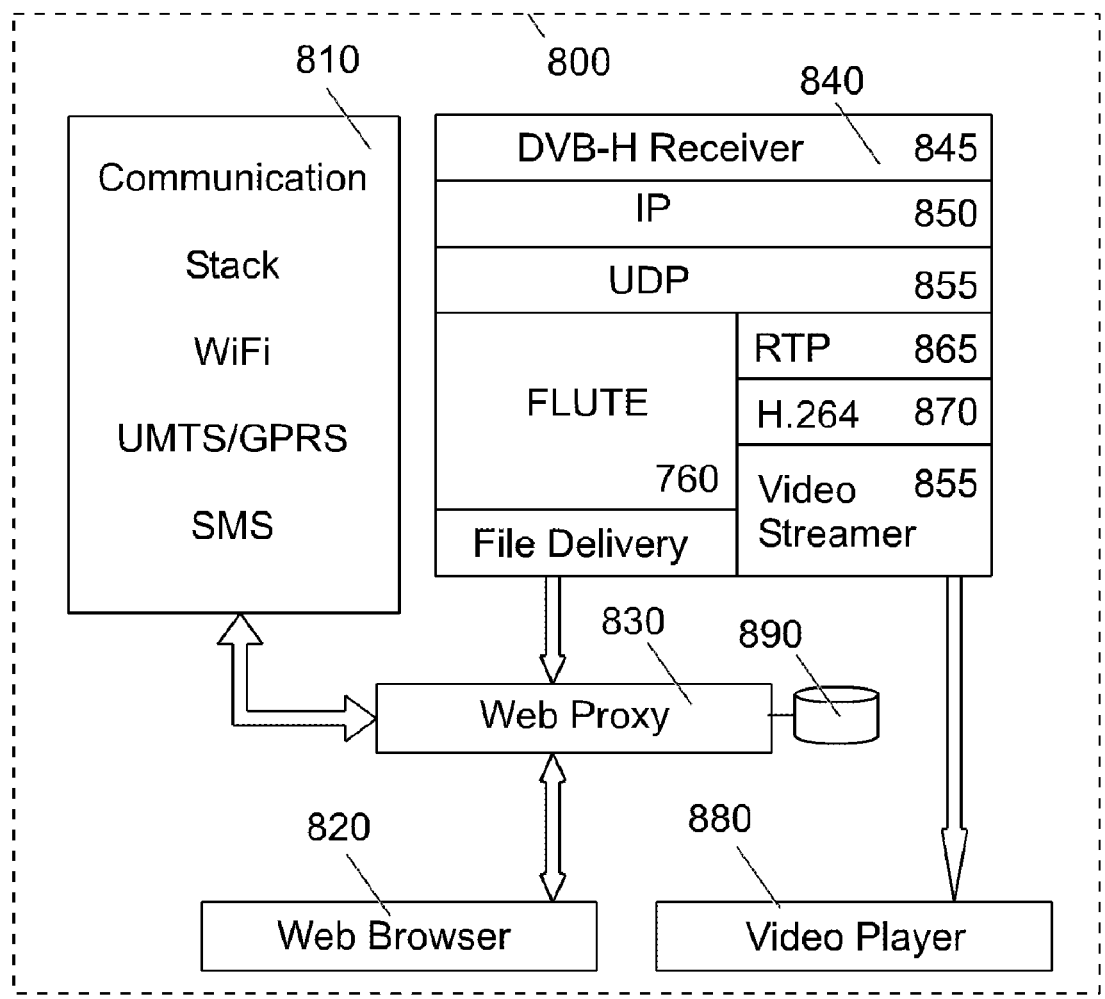
FIG. 8 shows the structure of a web client including object cache in accordance with the present invention.

FIG. 7 shows the structure of the object that is transported from the transmission end to the mobile device. Before storing a web object in the scheduler (carrousel) in order to broadcast it to the mobile terminal, the web object is formed into a data packet or container 700. The data packet includes a number of different fields set out below.

A OID reference 710 is shown, which is the object identifier associated with the web object by the web site pump 210 and which is attributed to it during the translation phase. The web object size 730 is indicated followed by the web object itself 740. The web object may be a text page, an audio file, an image or any other type of web object. A set of neighbor groups 750, 760, 770 are shown, these map the neighbor objects separated by a given number of hops from a specific or reference web object. Neighbor group1 (750) maps all objects separated by only one hop from the reference web object, while neighbor group2 (760) maps all objects separated by two hops and neighbor groupn (770) maps all object separated by "n" hops. The end of the data packet is represented by the hexadecimal value x'00'.

Each neighbor group is structured in a specific manner and neighbor group1 750 is shown by way of example. The structure includes a neighbor group ID 751 which identifies a network group and the number of hops separating all objects of that group from the reference object. Accordingly a group for hop count equals to one will be identified. Also a group for hop count equals 2 and so on will be identified. This will continue for the maximum number of hops found in the closed web site. The web objects count 752 is also found in the structure and represents the number of web objects (represented by their OID) belonging to this group. A list of OID's 753 and 754 which are neighbor at a specific hop count from the neighbor group ID is also determined. In this way there are all relevant details of the closed web site and the tree structure in each data packet. This will enable the predictive caching of web object in accordance with user requests.

The data packets are transmitted to the web client in the mobile device as will now be described with reference to FIG.

8. The web client 800 on the mobile device includes a web browser 820 communicating with the web server through a communication stack 810. The communication stack may use one of the widely used protocols such as WIFI, 2.5 G and 3 G protocols (GPRS, EDGE, UMTS). The web client also includes a video player 880 and a DVB-H receiver 840. Terminals supporting TV broadcast have new functions in accordance with the present invention as will be described below.

The Mobile TV receiver includes a number of different functions and layers, for example: a DVB-H Receiver 845; an IP module 850; a user datagram protocol (UDP) module 855 and two session layers 860 and 865 are provided for the data part FLUTE (File Delivery over Unidirectional Transport) and for the video RTP (Real Time Protocol) respectively.

The video processing elements also includes a H.264 decoder 870 and a video streamer 875. The output from the video streamer is sent to the video player 880 for display to the user.

The present invention implements a new component which may be launched as a service which intercepts all requests from the browser and acts as a web proxy 830. This new component examines all files received on FLUTE and delivers to the browser the requested file as soon as it has been received. This component does not need any modification by the client applications, just a configuration of the web browser to define usage of the local web proxy. The web proxy caches the page and then passes it to the web browser. A main function of this client is the predictive caching mechanism which aims to save all neighboring web objects in its own memory 890. The memory may be a SD card, Compact Flash, SIM card or any other appropriate memory. The operation of the cache and memory will be described with reference to FIGS. 9 and 10.

Figure 9A:
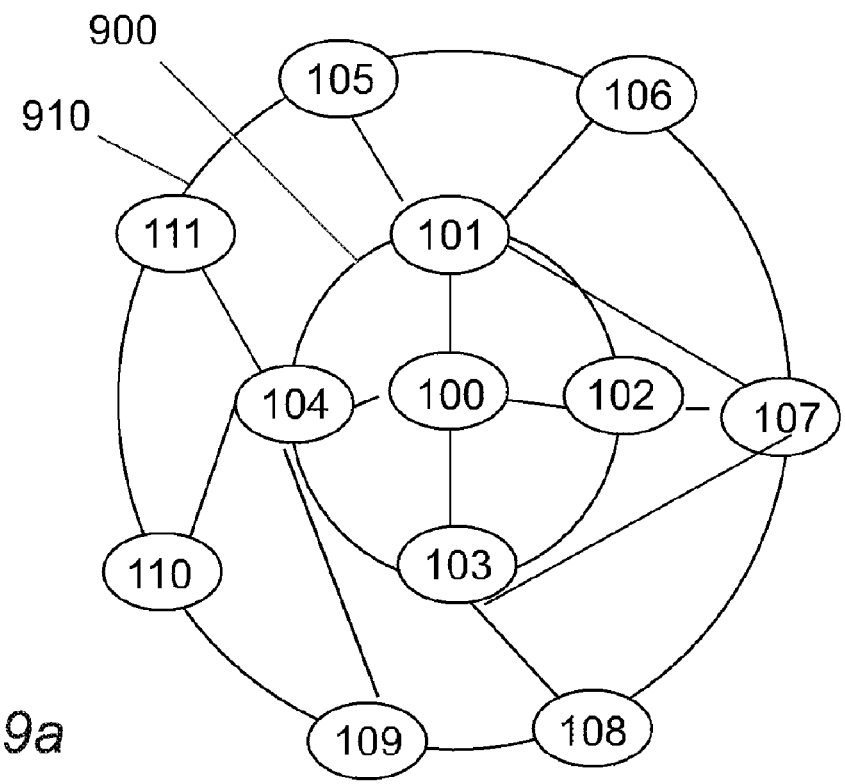
FIG. 9A shows active web objects with 1 and 2 hops around a first reference object.
Figure 9B:
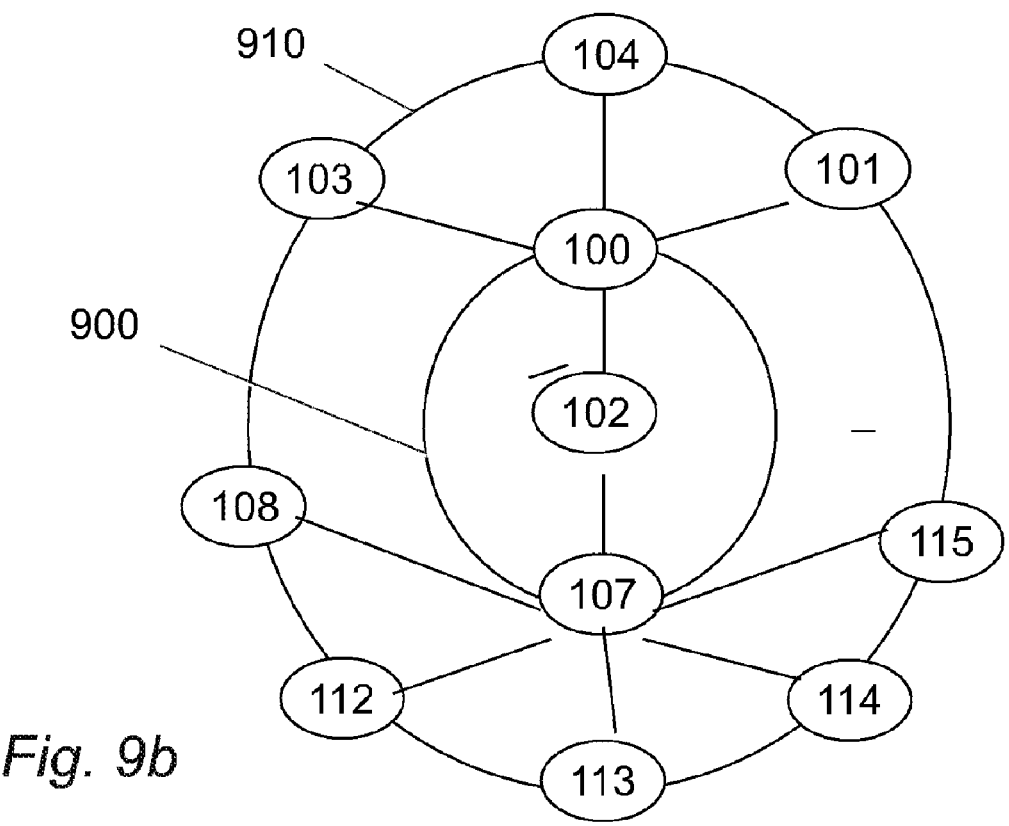
FIG. 9B shows new active web objects with 1 and 2 hops around a second reference object.

FIGS. 9A and 9B show the objects with 1 or 2 hops around a reference web object 100 for FIG. 9A and web object 102 (which becomes the reference web object in this example) for FIG. 9B. In these figures the active web object (HTML page or translation thereof) is represented in the center. Concentric circles 900 and 910 represent the set of neighbor web objects separated by one hop for circle 900 and the set of objects separated by two hops for circle 910. Obviously there may be many other concentric circles (or layers) to represent the sets of web objects separated by higher numbers of hops (3, 4, ... ), but in the example chosen to illustrate the invention, the number of hops has been arbitrarily fixed at two.

All the objects belonging to a neighbor set may be cached in the memory 890. The numbers of layers which are cached will depend on the size of the memory and the sizes of the web objects and also will depend on the prediction factors discussed below.

In the FIG. 9A, the active web object (object currently displayed in the web browser) is 100. This web object has four neighboring web objects separated by one hop, namely 101, 102, 103 and 104. Moreover this same active web object has seven neighboring web objects separated by two hops, namely 105, 106, 107, 108, 109, 110 and 111. If a user chooses to click on a link relating to web object 102 a new configuration is formed. This new configuration has web object 102 (the now active web object) in the center and the neighboring web objects at one hop are now web objects 100 and 107 and those at two hops are now web objects 101, 103, 104, 108, 112, 113, 114 and 115. By selecting the active web object to be page 102 there are four new objects 112, 113, 114 and 115 reachable in two hops. These must now be cached. At the same time five old objects 105, 106, 109, 110 and 111 are no more in the neighbor scope and thus may be removed from the cache if necessary to free up memory.

The information relating to the objects and how they are cached may be stored in a table such as that illustrated in FIG. 10. This cache table 1000 is used by the predictive caching function and includes the information detailed below.

The OID 1010 is stored as this is the object identification which is associated with the web object belonging to the closed web site by the web pump of the server and is used throughout the invention as the "identifier" of the web object. The table also includes the status 1020, which depicts the status of the web object in the web cache. Examples of status may include:

"Cached": this indicates that the web object has been saved in the cache, as is the case with web object 104 (1060).

"May be suppressed": this indicates that the web object is present in the cache but no longer belongs to the group of neighbor web objects, as is the case with web object 106 (1070).

"To be cached": this indicates that the web object belongs to the scope of neighbor web objects but has not yet been received, as is the case with web object 111 (1080).

The cache table also includes an indication of the size (in for example kilobytes) 1030 of the object. This is used to calculate the total size taken up by all the objects in cache and to decide which object should be deleted to avoid overflow of the cache. A column hops 1040 represents the number of hops separating each object from the active object (active object is the html/wml page displayed in the web browser or the translation thereof). In the illustrated example the active web object is OID 102. A list of neighbor objects 1050 for OID neighbors with a known number of hops separating the table object from the current or active object are also shown. The list of all objects separated from the current OID by the number maximum of hops configured in the client. In the illustrated example the maximum number of hops is 2.

If it is assumed that a user is viewing a current active page (say OID 102) and clicks on a link to display a new page (say OID 107) a local variable "active page" is set in the table for OID 107. The current active page (OID 102) is then set to the local variable "previous page" in the line of the table associated with OID 102.

If "active page" (OID 107) has the status "cached", in other words this page has been received, a lookup of the cache table is done. The user can be immediately passed to the requested page or web object. The table also includes information relating to neighbors to this page and other information as previously described. As OID 107 is the "active page" the neighbor set for that page must be cached as soon as possible (if it is not already). So all neighbors of OID 107 at one hop are set to "cached" or "To be cached". In addition if space permits those at two, three or more hops may be marked similarly. If there is insufficient space to cache all web objects or pages at two, three or more hops a selection may be made based first on lowest hop number then on size or another parameter to determine the pages to cache and those to be cached when space permits. In addition, any neighbors of the "previous page" (OID 102) which are not neighbors of OID 107 may now be dropped out of the cache. This is due to the fact that there is now less likelihood of these pages being requested by the user as they are a greater number of hops from the "active page" currently being viewed. Accordingly any neighbors of OID 102 (which are not neighbors of OID 107) may be marked "may be suppressed" in the table. If space is required these web objects can be removed from the cache and be replaced with pages or web objects that are closer to the "active page" as described above.

If the "active page" OID 107 has a status "to be cached", the system must wait for the reception of this page before it can be viewed. The details of the neighbor set for the "active page" is known from the table and thus the arrival and transmission of all pages are monitored. When a web object or page is received it is set to "cached" in the table and stored in the memory if it is the "active page" or any page having an OID in the neighbor set thereof. If the OID belongs to the set of neighbors of the "previous page" and does not belong to the neighbor set of the "active page" the web object is set to "may be suppressed". Any pages of the "active page" which are not already on route and captured as above will be marked "to be cached" and a request for delivery will be made.

Figure 11:
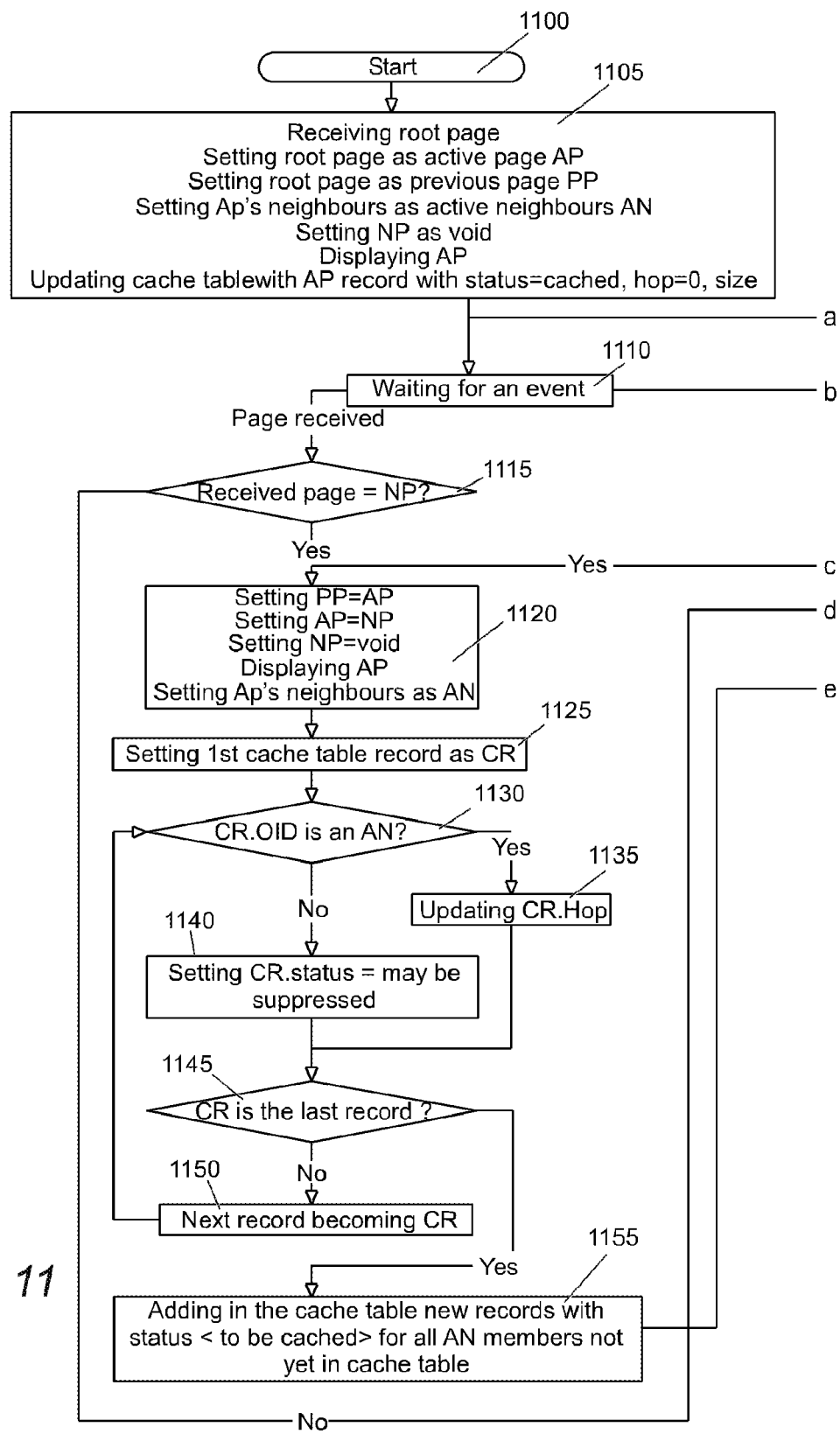
FIG. 11 depicts the process steps for managing the cache in a predictive way in accordance with the present invention.
Figure 11:
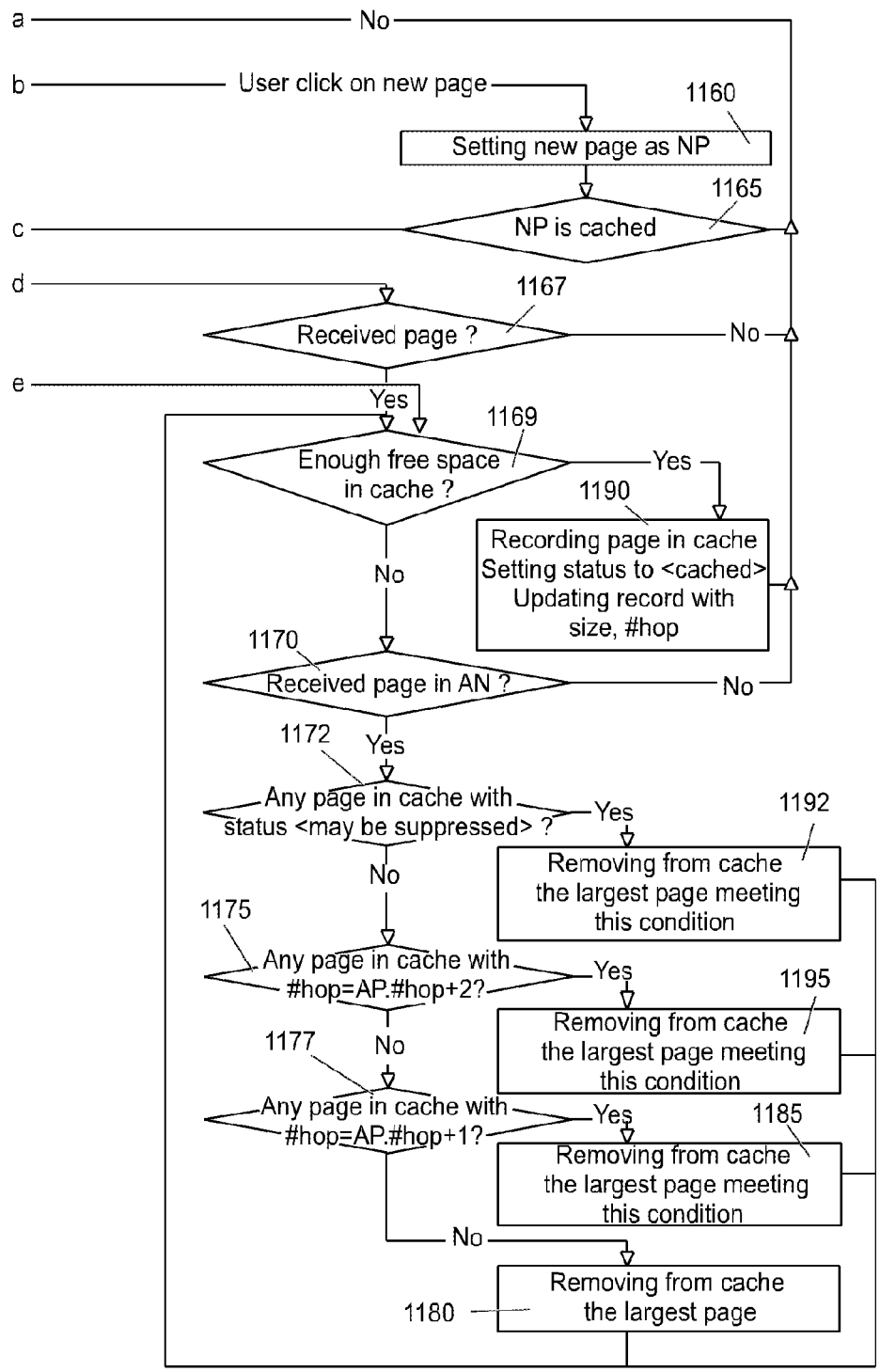

These process steps for this are described in greater detail with respect to FIG. 11.

The process is started at step 1100.

At step 1105, the process determines the root page of the active drive and sets it to be the "active page" in a local variable called AP. Also the local variable called PP which points to the "previous page" is set to the root page. The neighbors of the active page are set as the "active neighbors" (or local variable AN) and the local variable NP which points to a "new page" is set equal to empty or void, because at the moment there is not a "new page". Then the AP is displayed and the cache table 1000 is updated with the AP record field status 1020 set to "cached" and the hop field 1040 set to zero.

At step 1110, the process is waiting for an event to occur. If a page is received, then the process continues from step 1115. If the user clicks on a new page, then the process continues from step 1160. In any other case the process remains at step 1110.

At step 1115, an analysis is carried out to determine if the received page is equal to NP. If this is the case (YES), then the process moves to step 1120; otherwise (NO) the process passes to step 1169.

At step 1120, the local variable PP is set to equal AP, the local variable AP is set to equal NP, the local variable NP is reset to equal void. AP is displayed and local variable AN is set to equal the set of neighbors for AP. This step essentially updates the table 1000 and the page viewed by the user in accordance with receipt of a page. This page may be the root page or any other in the closed wed site.

At step 1125, the local variable CR ("current record") is set equal to the first record of the cache table 1000.

At step 1130, a determination is made as to whether CR.OID belongs to AN. If it is the case (YES), then the process passes to step 1135; otherwise (NO) the process passes to step 1140.

At step 1135, the hop field 1040 of CR is updated to reflect the new number of hops with respect to the AP and then the process passes to step 1145.

At step 1140, the status field 1020 of CR is set to equal "may be suppressed" and the page may be deleted as and when memory is needed for other pages or objects.

At step 1145, an analysis is carried out to determine if CR is the last record of the cache table 1000. If this is the case (YES) then the process passes to step 1155; otherwise (NO) the process passes to step 1150.

At step 1150, the record sequentially after CR becomes CR and the process passes to step 1130.

At step 1155, the cache table 1000 is updated by adding a new record for each member of AN, with a status field 1020 set equal to "to be cached".

At step 1160 (reached from step 1110 if the user clicks on a new page) the local variable NP is set to equal the new page chosen by the user.

At step 1165, a determination is made to determine if this NP is already cached. If this is the case (YES) the process passes to step 1120; otherwise (NO) the process passes to step 1110.

At step 1167, an analysis is carried out to determine if the last event is the reception of a page. If this is the case (YES) the process passes to step 1169; otherwise (NO) the process passes to step 1110 once again.

At step 1169, an analysis is carried out to determine if there is enough free space in the cache for storing the received page. If this is the case (YES) the process passes to step 1190; otherwise (NO) the process passes to step 1170.

At step 1170, an analysis is carried out to determine if the received page is present in AN. If this is the case (YES) the process passes to step 1172; otherwise (NO) the process passes to step 1110.

At step 1172, an analysis is carried out to determine if the cache contains any page with a status field 1020 equal to "may be suppressed". If this is the case (YES) the process passes to step 1192; otherwise (NO) the process passes to step 1175.

At step 1175, an analysis is carried out to determine if the cache contains any page whose hop count exceeds the AP hop count by two (2). If this is the case (YES) the process passes to step 1195; otherwise (NO) the process passes to step 1177.

At step 1177, an analysis is carried out to determine if the cache contains any page whose hop count exceeds the AP hop count by one (1). If this is the case (YES) the process passes to step 1185; otherwise (NO) the process passes to step 1180.

At step 1180, the largest page found in the cache is removed. Then the process passes to step 1169.

At step 1185, the largest page of the cache meeting the condition of step 1177 is removed. Then the process passes to step 1169.

At step 1190, the received page is recorded in the cache; the status field 1020 of the received page is set to equal "cached" and the other fields such a size 1030 and hops 1040 etc. are updated according to the characteristics of the page. Then the process passes back to step 1110.

At step 1192, the largest page of the cache meeting the condition of step 1172 is removed. Then the process passes back to step 1169.

At step 1195, the largest page of the cache meeting the condition of step 1175 is removed. Then once again the process passes back to step 1169.

The above described method steps are carried out at the receiver end of the system. This relates to the management and provision of the web object to the user. In parallel the video is transmitted over the same transport stream or broadcast and received at the same end device. The bursts carrying video and web objects are recognised in accordance with normal DVB-H practices. Details of the methodology for transmission and reception of the broadcast stream is described in details in our co-pending application (FR09 2006 0029), incorporated herein by reference.

The mobile device may be of any type, including for example, PDAs, mobile phones or any other type of device which is mobile and can communicate remotely.

The standards such as DVB-H, RTP, H.264 etc described herein are shown by way of example only and any other standards present or future may be equally applicable.

The broadcaster may have influences on the closed web site to enable them to match the broadcast media, for example, tickets for the next match if a user is watching a certain game, appropriate advertising, etc.

While the invention has been particularly shown and described with reference to a preferred embodiment, it will be understood that various changes in form and detail may be made therein without departing from the spirit, and scope of the invention.

The invention claimed is:

1. A method of controlling the storage of web objects in a storage media, the web objects forming a closed web site which has no reference to an external web site, and being adapted for delivery to a user, the web objects being stored on the basis of predictive determinations of which web object has a highest probability of being selected from the closed web site by the user, the method comprising the steps of:
   a) identifying a plurality of web objects which form the closed web site;
   b) determining a web tree of the closed web site by computing a number of steps between each of said plurality of web objects to every other of said plurality of web objects;
   c) storing said number of steps between each of said plurality of web objects;
   d) identifying at least one parameter associated with each web object in the web tree;
   e) determining from the at least one parameter of each web object a probability of the web object being selected so as to generate a list of likely web objects, wherein said step of determining the probability of each web object being selected comprises determining a numbers of steps from an active web object to each web object in the closed web site, such that a group of neighboring objects with a lower number of steps with respect to the active web object have a higher probability of being selected than a group of neighboring objects with a higher number of steps, and for each of group of neighboring objects, determining the size of web object having the same number of steps such that those of a smaller size have a higher probability than those with a bigger size;
   f) ordering the likely web objects in accordance with their probability;
   g) storing the web object from the set of likely objects in order of their relative probability such that those with the highest probability are stored first; and
   h) continuing the storing step for as long as there is available capacity in the storage media.

2. The method of claim 1, wherein the step of determining the probability of each web object being selected comprises determining the number of neighboring web objects for each web object.

3. The method of claim 2, wherein the step of determining the probability of each web object being selected comprises determining the number of links to other web objects in each web object.

4. The method of claim 1, wherein the step of determining the probability of each web object being selected comprises determining the number of links to other web objects in the or each web object.

5. The method of claim 1, wherein the step of determining the probability of each web object being selected comprises determining the number of neighboring web objects for each web object.

6. The method of claim 1, wherein the step of determining the probability of each web object being selected comprises determining the size of each web object such that those of a smaller size have a higher probability than those with a bigger size.

7. The method of claim 1, further comprising the step of updating the determination of parameters if the user selects a web object, such that a new set of parameters are determined and used to determine the probability of the subsequent selection of the user.

8. The method of claim 7, further comprising the step of removing web objects from the storage media based on the probabilities for the subsequent selection, such that the web object with the lowest priority of being subsequently selected is removed first.

9. The method of claim 8, further comprising the step of removing the web objects from the storage media until there is sufficient space in the storage medium for new high probability web objects.

10. The method of claim 7, further comprising the step of repeating the updating step each time the user makes a selection.

11. The method of claim 7, further comprising the step of forming a table of the parameters for each web object so that the probability can be determined from the table of parameters.

12. A method of viewing a web object at a remote mobile device having a memory, wherein the web object is transmitted to the remote mobile device over a broadcast standard channel, the method of viewing comprising the steps of:
   a) receiving a plurality of identified web objects forming at least part of a closed web site which has no reference to an external web site, wherein each web object includes at least one parameter which determine a probability of a user selecting that object, said probability calculated by determining a numbers of steps from an active web object to each web object in the closed web site, such that a group of neighboring objects with a lower number of steps with respect to the active web object have a higher probability of being selected than a group of neighboring objects with a higher number of steps, and for each of group of neighboring objects, determining the size of web object having the same number of steps such that those of a smaller size have a higher probability than those with a bigger size;
   b) receiving a number of steps between each of said plurality of identified web objects to every other of said identified web objects;
   c) storing the web objects in the memory in accordance with the probability, such that those with the highest probability are stored first;
   d) selecting a web object to view, thereby causing an update to the at least one parameter and a new probability for each web object being subsequently selected;
   e) updating the web objects stored in memory based on the new probability such that those with the highest new probability are stored first; and
   f) repeating the selecting and updating steps as required.

13. A computer program stored on a non-transitory computer readable storage medium, comprising:
   a) means for identifying a plurality of web objects which form a closed web site which has no reference to an external web site;
   b) means for determining a web tree of the closed web site by computing a number of steps between each of said plurality of web objects to every other of said plurality of web objects;
   c) means for storing said number of steps between each of said plurality of web objects
   d) means for identifying at least one parameter associated with each web object in the web tree;
   e) means for determining from the at least one parameter of each web object a probability of the web object being selected so as to generate a list of likely web objects, wherein said step of determining the probability of each web object being selected comprises determining a numbers of steps from an active web object to each web object in the closed web site, such that a group of neighboring objects with a lower number of steps with respect to the active web object have a higher probability of being selected than a group of neighboring objects with a higher number of steps, and for each of group of neighboring objects, determining the size of web object having the same number of steps such that those of a smaller size have a higher probability than those with a bigger size;

f) means for ordering the likely web objects in accordance with their probability;

g) means for storing the web object from the set of likely objects in order of their relative probability such that those with the highest probability are stored first; and h) means for continuing the storing step for as long as there is available capacity in the storage media.

14. The computer program of claim 13, further comprising means for updating the determination of parameters if the user selects a web object, such that a new set of parameters are determined and used to determine the probability of the subsequent selection of the user.

15. The method of claim 14, further comprising means for removing web objects from the storage media based on the probabilities for the subsequent selection, such that the web object with the lowest probability of being subsequently selected is removed first.

16. The method of claim 14, further comprising means for repeating the updating each time the user makes a selection.

17. The method of claim 14, further comprising means for forming a table of the parameters for each web object so that the probability can be determined from the table of parameters.

18. A computer program stored on a non-transitory computer readable storage medium for viewing a web object at a remote mobile device having a memory, wherein the web object is transmitted to the remote mobile device over a broadcast standard channel, comprising:

a) means for receiving a plurality of identified web objects forming at least part of a closed web site, wherein the web object includes at least one parameter which determine a probability of a user selecting that object, said probability calculated by determining a numbers of steps from an active web object to each web object in the closed web site, such that a group of neighboring objects with a lower number of steps with respect to the active web object have a higher probability of being selected than a group of neighboring objects with a higher number of steps, and for each of group of neighboring objects, determining the size of web object having the same number of steps such that those of a smaller size have a higher probability than those with a bigger size;

b) means for receiving a number of steps between each of said plurality of identified web objects to every other of said identified web objects;

c) means for storing the web objects in the memory in accordance with the probability, such that those with the highest probability are stored first;

d) means for selecting a web object to view, thereby causing an update to the at least one parameter and a new probability for each web object being subsequently selected;

e) means for updating the web objects stored in memory based on the new probability such that those with the highest new probability are stored first; and f) means for repeating the selecting and updating steps as required.

* * * * *